(12) United States Patent
Farber

(10) Patent No.: US 10,361,021 B1
(45) Date of Patent: Jul. 23, 2019

(54) SYSTEM AND METHOD FOR MAGNETIC LEVITATION

(71) Applicant: George Farber, Federal Way, WA (US)

(72) Inventor: George Farber, Federal Way, WA (US)

( * ) Notice: Subject to any disclaimer, the term of this patent is extended or adjusted under 35 U.S.C. 154(b) by 653 days.

(21) Appl. No.: 14/322,381

(22) Filed: Jul. 2, 2014

Related U.S. Application Data

(63) Continuation of application No. 12/018,145, filed on Jan. 22, 2008, now Pat. No. 8,803,646.

(51) Int. Cl.
*H01F 7/02* (2006.01)
*H01F 1/00* (2006.01)
*H01F 7/00* (2006.01)

(52) U.S. Cl.
CPC .............. *H01F 7/00* (2013.01); *H01F 7/02* (2013.01); *H01F 7/0205* (2013.01)

(58) Field of Classification Search
CPC ..................................................... H02N 15/00
USPC ....... 335/284, 285, 288, 296, 298, 302, 306; 472/68
See application file for complete search history.

(56) References Cited

U.S. PATENT DOCUMENTS

| | | | | |
|---|---|---|---|---|
| 2,693,788 A | * | 11/1954 | Spatz | 211/69.1 |
| 4,727,299 A | * | 2/1988 | Liu | 318/128 |
| 4,753,623 A | * | 6/1988 | Krut | 446/133 |
| 5,559,384 A | * | 9/1996 | Boland et al. | 310/90.5 |
| 6,176,609 B1 | * | 1/2001 | Cleveland et al. | 366/273 |
| 6,781,270 B2 | * | 8/2004 | Long | 310/90.5 |
| 7,495,537 B2 | * | 2/2009 | Tunay | 335/306 |
| 2006/0214756 A1 | * | 9/2006 | Elliott et al. | 335/306 |
| 2007/0210886 A1 | * | 9/2007 | Gerber | 335/306 |

* cited by examiner

*Primary Examiner* — Mohamad A Musleh

(57) ABSTRACT

A system and method for magnetic levitation. In one embodiment, a magnetic levitation base together with a magnetic levitation affecting element that is located to the side of the levitation base support the magnetic levitation of a spinning magnetic top. In one embodiment, the levitation affecting element may comprise one or more magnets similar to that of the levitation base. A mass of the top and a tilt of the levitation base that may be required for magnetic levitation may be adjusted by adjusting the levitation affecting element (e.g. altering its position and/or the strength of its magnetic field.) The general direction of a tilt may be reversed by changing the magnetic north-south direction (e.g. turning over or reversing the electromagnetic current) of the levitation affecting element.

21 Claims, 4 Drawing Sheets

SYSTEM AND METHOD FOR MAGNETIC LEVITATION

CROSS-REFERENCE(S) TO RELATED APPLICATION(S)

This application is a continuation of U.S. patent application Ser. No. 12/018,145, filed Jan. 22, 2008, entitled "System and Method For Magnetic Levitation With Tilted Orientation", priority from the filing date of which is hereby claimed under 35 U.S.C. § 120, and which is hereby incorporated by reference in its entirety.

FIELD OF THE INVENTION

The invention relates generally to magnetic levitation systems, and more particularly to a system and method for magnetic levitation of a float element such as a spinning magnetic top.

BACKGROUND OF THE INVENTION

Magnetic levitation occurs when an object is suspended above another object with no support other than magnetic fields. U.S. Pat. Nos. 4,382,245, 5,404,062, 5,883,454 and 6,608,540 disclose magnetic levitation systems in which a magnetic top may be made to levitate above a lower repelling magnetic base. In such systems, to achieve the levitation, a lifter sheet (e.g. made of plastic) may initially be placed over the magnetic base. The magnetic top is then manually spun on top of the lifter sheet (the magnetic forces from the base causing the top to remain centered while it spins), after which the lifter sheet is manually lifted above the magnetic base, thus causing the magnetic top to also be lifted. Once the magnetic top reaches a certain critical height, the magnetic forces from the base cause the top to elevate to a position where magnetic levitation is maintained. If the strength of the magnetic base is too great, or if the magnetic top is not weighted properly, the magnetic top will rise too high and will fall off to one side. In this case, weights (e.g. washers placed on the magnetic top and held in place with a rubber O-ring) may be added to keep the magnetic top from rising too far. Conversely, if the magnetic top is too heavy to remain in the stable levitation region, it will fall back toward the base and will not lift off from the lifter sheet when raised to the critical point. In this case, weights (e.g. washers) may be removed from the top, after which the process may be tried again. Through this process, a proper weighting for the magnetic top may be found, for which the magnetic top will levitate in the stable levitation region for a period of time (e.g. several minutes.) However, even when the top is properly weighted to achieve magnetic levitation under certain environmental conditions, over time the environmental conditions may change (e.g. temperature, position, the magnetism changing due to the top or base being struck, etc.) and the top may again need to be reweighted in order for magnetic levitation to be achieved. In other words, such systems tend to be sensitive to even minor environmental changes.

As a further complication, in systems such as those of the above cited '062, '454 and '540 patents, it is also important that the base magnet be positioned so that it is sufficiently level. As a result, in addition to the adjustments to the weight of the floating top, devices such as shims, tripod adjusters, etc. must also frequently be used to adjust the magnetic base to a sufficiently level position. More specifically, even when the floating top is properly weighted, if the magnetic base is not sufficiently level (e.g. due to the table or other surface that the base is placed on not being sufficiently level) then the top will not float over the center and will instead fall off of the base to one side. Thus, the user is frequently required to not only adjust the weight of the top, but also to adjust the leveling of the base with devices such as shims or tripod adjusters. These types of adjustments are further complicated by the fact that it is not always clear which aspect needs adjustment, and/or how much adjustment should be made (i.e. if the top falls off to one side, it may be unclear as to whether this is occurring because the top has insufficient weight, or if the base is not sufficiently level.) Thus, such systems tend to be very sensitive and frequently require adjustment and in particular are limited with regard to the orientation of the levitating top and base in that it must be made sufficiently level with a high degree of precision in order for magnetic levitation to be achieved. The present invention is directed to a system and method for magnetic levitation with greater flexibility, including the ability to achieve magnetic levitation with a tilted orientation.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one aspect of the invention, a system and method for magnetic levitation is provided. As described above, in certain known systems it has been required that the magnetic base be made sufficiently level in order for magnetic levitation to be achieved. In such systems the gyroscopic effects of the float element, coupled with the gravitational forces acting on the spinning float element, and the magnetic forces from the levitation base, are carefully balanced to allow levitation to be achieved and this balancing generally occurs (particularly with regard to the gravitational forces) when both the levitation base and the float element are sufficiently level. In contrast, in accordance with the present invention in one embodiment magnetic levitation may be achieved in a system in which the base magnet and/or the float element (e.g. a spinning magnetic top) have a significant tilt.

In accordance with another aspect of the invention, in one embodiment the magnetic levitation base, together with a magnetic levitation affecting element that is located to the side of the levitation base, support the magnetic levitation of the float element (e.g. a spinning magnetic top) in the tilted orientation. The placement of the magnetic levitation affecting element to the side differs from the above described known systems in that in such systems the magnetic fields (e.g. of the base and float element) have generally been centered and/or are generally coaxial relative to one another. It will be appreciated that by placing the levitation affecting element to one side such that it is not coaxial nor centered above or below the magnetic base or the float element, that such a configuration might previously have been thought to make magnetic levitation unachievable due to the unbalancing effect of the magnetic forces to one side. In contrast, in accordance with the present invention this configuration not only allows magnetic levitation to be achieved, but with a proper mass adjustment of the float element and a proper orientation of the levitation base, allows magnetic levitation to be achieved with a tilted orientation.

In accordance with another aspect of the invention, in one embodiment the levitation affecting element may comprise one or more magnets similar to that of the levitation base. In another embodiment, the levitation affecting element and the levitation base may be formed from different regions of a single piece of magnetic material.

In accordance with another aspect of the invention, in one embodiment the levitation base, float element and levitation affecting element may all comprise permanent magnets. In another embodiment, electromagnets may also be utilized, although it will be appreciated that electronic feedback systems are not required in order to maintain the magnetic levitation. In other words, while feedback systems may be utilized in certain applications, the levitation base, float element and levitation affecting element may be configured to maintain the magnetic levitation without requiring electronic feedback. Similarly, while components such as diamagnetic or superconducting materials may be utilized in certain applications, they are not required to maintain the magnetic levitation with the tilted orientation in accordance with the present invention.

In accordance with another aspect of the invention, experimental trials have indicated that the tilted orientation may be at least as much as 5, 10 or 15 degrees in various implementations. Furthermore, in certain embodiments the tilt angle of the float element (e.g. a levitating magnetic top) may be greater than the tilt angle of the levitation base.

In accordance with another aspect of the invention, the mass of the float element and the tilt of the levitation base that are required for magnetic levitation may be adjusted by adjusting the levitation affecting element (e.g. by adjusting its position and/or the strength of the magnetic field.) Furthermore, the direction of the tilt may be reversed by changing the magnetic north-south direction of the levitation affecting element (e.g. by turning the levitation affecting element over or by switching the direction of the current in the case of an electromagnet.)

In accordance with another aspect of the invention, at least a portion of the surface of the float magnet is flat and the tilt during magnetic levitation is measured during a period of stable magnetic levitation for the average orientation of the portion of the surface relative to a horizontal plane. In another embodiment, the tilt of the float magnet during magnetic levitation is measured for the centroid orientation of the axis of rotation relative to a vertical reference during a period of stable magnetic levitation. In another embodiment, the tilt of the float magnet during magnetic levitation is measured relative to the orientation of the float magnet as it would exist during magnetic levitation over the magnetic base without the presence of the levitation affecting element. In other words, when the levitation affecting element is not present and the magnetic base is made to be sufficiently level and the mass of the float element is adjusted to achieve magnetic levitation, the orientation of the float magnet during magnetic levitation in this configuration is utilized as the reference for measuring the differential tilt of the float magnet during magnetic levitation when the levitation affecting element is present.

In accordance with another aspect of the invention, in one embodiment the base magnet is made entirely of a magnetic material and has a first axis and a planar first surface and is magnetized normal to the first surface and parallel to the first axis, and the magnetic field is weakened in a region of the first surface. In one implementation, the levitation affecting element may comprise one or more magnets that are similar to the base magnet.

In accordance with another aspect of the invention, a method for magnetic levitation includes providing a base magnet for producing at least a first magnetic field portion, a float magnet for being magnetically levitated, and a magnetic levitation affecting element proximate to the base magnet so that it affects the levitation of the float magnet but such that it is not centered above or below the base magnet or the float magnet during magnetic levitation. The base magnet is tilted so as to compensate for the effect of the magnetic levitation affecting element on the float magnet during magnetic levitation, and the resulting orientation of the float magnet during magnetic levitation is tilted. In various implementations, the float magnet is titled by at least as much as 5, 10 or 15 degrees.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1A:
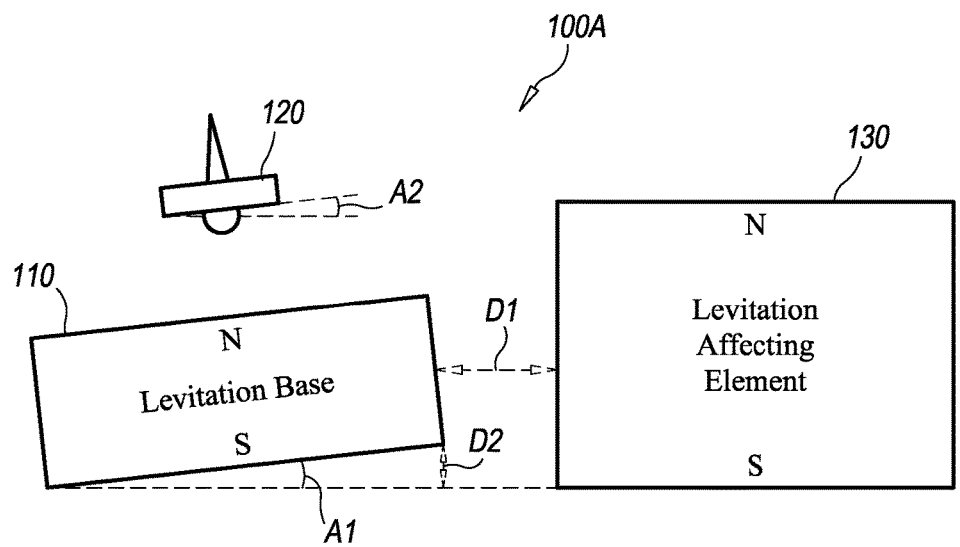
FIGS. 1A and 1B are diagrams of a first exemplary embodiment of a levitation system formed in accordance with the present invention.

FIG. 1A is a diagram of a first exemplary embodiment of a levitation system 100A formed in accordance with the present invention. As shown in FIG. 1A, the levitation system 100A includes a levitation base 110, a float element 120 and a levitation affecting element 130. As will be described in more detail below, in addition to the types of adjustments made in certain known levitation systems (e.g. adjustments to the weighting of the float element 120 and to the tilt of the levitation base 110), in accordance with the present invention additional adjustments utilizing the levitation affecting element 130 may be made which allow magnetic levitation with a tilted orientation to be achieved.

As shown in FIG. 1A, the levitation affecting element 130 is placed so that the direction of its north-south magnetic orientation is generally similar to that of the levitation base 110 (i.e. north-upwards.) The levitation affecting element 130 is positioned at a distance D1 from the levitation base 110. One side of the levitation base 110 is raised to a height D2 which produces a tilt angle A1. The tilt angle A1 of the levitation base 110 may be adjustable by utilizing various mechanisms such as shims, tripod adjusters, electro-mechanical mechanisms, etc. (not shown.) As will be described in more detail below, the tilt angle A1 of the levitation base 110 and the combined magnetic fields of the levitation base 110 and the levitation affecting element 130 cause the float element 120 to magnetically levitate with a tilt angle A2. In certain implementations, the tilt angle A2 of the float element 120 may be different (e.g. greater) than the tilt angle A1 of the levitation base 110.

In one implementation, the levitation affecting element 130 may comprise one or more permanent magnets similar to that of the levitation base 110. In one specific example embodiment, the levitation base 110, float element 120 and levitation affecting element 130 may be formed from components available from www.levitron.com. More specifically, the levitation base 110 may in one embodiment be formed from a Levitron® Cherrywood magnetic base, while the float element 120 is the accompanying magnetic top, and the levitation affecting element 130 is formed from three Super Levitron® square magnetic bases, stacked one on top of the other. In this specific example embodiment, for a distance D1 between the levitation base 110 and the levitation affecting element 130 of approximately 8 centimeters, and a differential height D2 of the right side of the levitation base 110 of approximately 2.5 centimeters (e.g. the right side being raised by two shims beneath the tripod adjuster on that side), the corresponding tilt angle A1 of the levitation base 110 is approximately 9 degrees, while the tilt angle A2 of the float element 120 during magnetic levitation is approximately 15 degrees.

As will be described in more detail below, with the presence of the levitation affecting element 130, in addition to the tilt angle A1 of the levitation base 110 being required for magnetic levitation to be achieved, the mass of the float element 120 may also require adjustment (e.g. removing washers) in order to achieve the magnetic levitation. In general, the smaller the distance D1 between the levitation base 110 and the levitation affecting element 130, the greater the required tilt angle A1, and the less mass required of the float element 120 in order to achieve magnetic levitation. In the embodiment described above, the distance D1 is reduceable to a point where magnetic levitation may be achieved with no washers being placed on the float element 120 (this being significantly less mass for the float element 120 than is required for magnetic levitation in a non-tilted orientation above the levitation base 110 without the presence of the levitation affecting element 130). As will be described in more detail below with respect to FIG. 1B, when the north-south direction of the levitation affecting element 130 is reversed (i.e. south-upward), greater mass may be required for the float element 120 than is required for a similar arrangement in the configuration of the levitation system 100A.

Figure 1B:
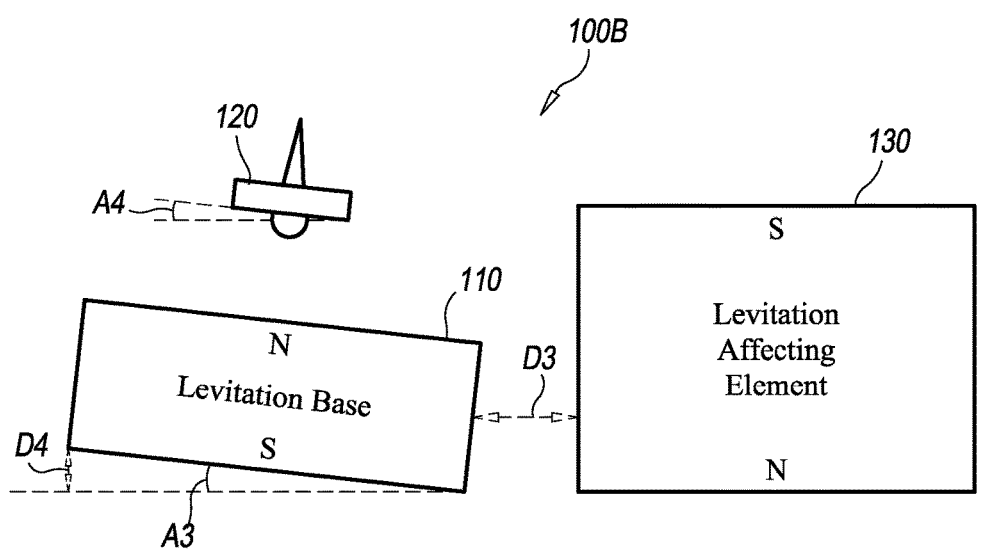

As shown in FIG. 1B, a levitation system 100B includes the levitation base 110, the float element 120 and the levitation affecting element 130. In contrast to the levitation system 100A of FIG. 1A, in the levitation system 100B the north-south direction of the levitation affecting element 130 is shown to be reversed (i.e. south-upward.) In an embodiment where the levitation affecting element 130 comprises one or more permanent magnets, the reversal of the north-south direction may be achieved in one implementation by turning the magnets over. Alternatively, in an embodiment where the levitation affecting element comprises an electromagnet, the reversal may be achieved in one implementation by reversing the electromagnetic current. As will be described in more detail below, with the reversal of the north-south direction of the levitation affecting element 130 in the levitation system 100B, the levitation base 110 and float element 120 are shown to be tilted during magnetic levitation in the generally opposite direction to that which they were in the levitation system 100A.

As shown in FIG. 1B, in the levitation system 100B the levitation affecting element 130 is positioned at a distance D3 from the levitation base 110. The side of the levitation base 110 that is furthest from the levitation affecting element 130 is raised to a height D4 which produces a tilt angle A3. The tilt angle A3 of the levitation base 110 may be adjustable by utilizing various mechanisms such as shims, tripod adjusters, electro-mechanical mechanisms, etc. (not shown.) The float element 120 is represented during magnetic levitation as having an average tilt angle A4. In the levitation system 100B, the tilt angles A3 and A4 are shown to be in a generally opposite direction relative to the tilt angles A1 and A2 of the levitation system 100A. As will be described in more detail below, in addition to the reversal of the tilt angles, the reversal of the north-south direction of the levitation affecting element 130 in the levitation system 100B also in certain implementations alters (e.g. increases) the mass required for the float element 120 that is needed for magnetic levitation to be achieved relative to that required for a similar arrangement in the configuration of the levitation system 100A.

The effect on the amount of mass of the float element 120 that is required for magnetic levitation may be further illustrated by the following example embodiment. In this example embodiment, configurations similar to those described above for the levitation systems 100A and 100B are utilized, although the magnet utilized for the levitation affecting element 130 is made to be much smaller. In one specific implementation, a small permanent magnet (e.g. similar to that of the float element 120) is utilized for the levitation affecting element 130 and is fixed in place in a vessel very near the side of the levitation base 110 (i.e the distance D1 or D3 is made to be very small) and approximately no tilt is applied to the levitation base 110.

In this example embodiment, the presence of the levitation affecting element 130 causes the required mass adjustment of the float element 120 to be approximately between 0.2 and 0.3 grams, either up or down depending on the north-south direction of the levitation affecting element 130. In other words, with the presence of the levitation affecting element 130, depending on the north-south direction, approximately 0.2-0.3 grams needs to be either added to or removed from the float element 120 in order to achieve magnetic levitation, as compared to the mass required without the presence of the levitation affecting element 130. More specifically, with a north-upward direction of the levitation affecting element 130, approximately 0.2-0.3 grams needs to be added to the float element 120, while for a south-upward direction, approximately 0.2-0.3 grams needs to be removed from the float element 120 in order to achieve the magnetic levitation.

In this example embodiment, any adjustment that may otherwise have needed to be made to the tilt of the levitation base 110 was insignificant enough that magnetic levitation was able to be achieved regardless of which side of the levitation base 110 the levitation affecting element 130 was placed on. In various implementations, the levitation affecting element 130 was rotated around to four different sides of the levitation base 110, and in each configuration the float element 120 was able to be magnetically levitated without requiring any tilt adjustment to the levitation base 110. However, as described above if the levitation affecting element 130 were removed from the system entirely, the magnetic levitation was not able to be achieved as the float element 120 required the mass adjustment of approximately 0.2-0.3 grams either up or down depending on the north-south direction of the levitation affecting element 130 prior to its removal.

It will be appreciated that the utilization of the levitation affecting element 130 to the side of the levitation base 110, for affecting the required mass of the float element 120, the required tilt of the levitation base 110 and the resulting tilt of the float element 120 during magnetic levitation provides a number of advantages. In previous levitation systems such as those of the above cited '062, '454 and '540 patents, it was regarded as critical that the levitation base 110 be made sufficiently level so that stable levitation could be achieved. The gyroscopic effects of the float element 120, coupled with the gravitational forces acting on the spinning float element 120, and the magnetic forces from the levitation base 110, were all carefully balanced to allow levitation to be achieved and the balancing occurred (particularly with regard to the gravitational forces) when both the levitation base 110 and the float element 120 were sufficiently level. In accordance with the present invention, the utilization of the levitation affecting element 130 allows significant tilt angles for both the levitation base 110 and the float element 120 to be achieved.

In addition, in embodiments where a significant tilt angle A1 of the levitation base 110 is utilized, it has been experimentally observed that when any additional tilt adjustment needs to be made, such adjustment primarily needs to be made with regard to the height D2. In other words, in prior systems, where a square levitation base 110 was utilized, shims may need to have been placed under any of the four sides, or in the case of a tripod support system, adjustments may need to have been made to any of the three legs. In contrast, in a system in which a substantial tilt angle is achieved through the use of the levitation affecting element 130, it has been observed that the primary adjustment that may further need to be made is with regard to the height D2. Initially, it may be noted that in a system with an intentionally tilted levitation base 110 that adjustments to more or less tilt may be made from the single location for the height D2, as opposed to the prior systems with a relatively flat base orientation for which tilt adjustments even along a single direction past zero degrees would require placing a shim under the opposite side of the levitation base and thus at least a second location for adjustment. In addition, with the utilization of the levitation affecting element 130, the primary tilt factor becomes related to the interaction between the levitation base 110 and levitation affecting element 130, and any tilt in any of the other directions may become relatively less of a factor. In other words, in comparison to prior systems in which adjustment to multiple locations may have been needed, the present invention may require adjustment primarily in one location, and thus in certain embodiments may simplify and reduce the time and effort required for achieving magnetic levitation of the float element 120.

Figure 2:
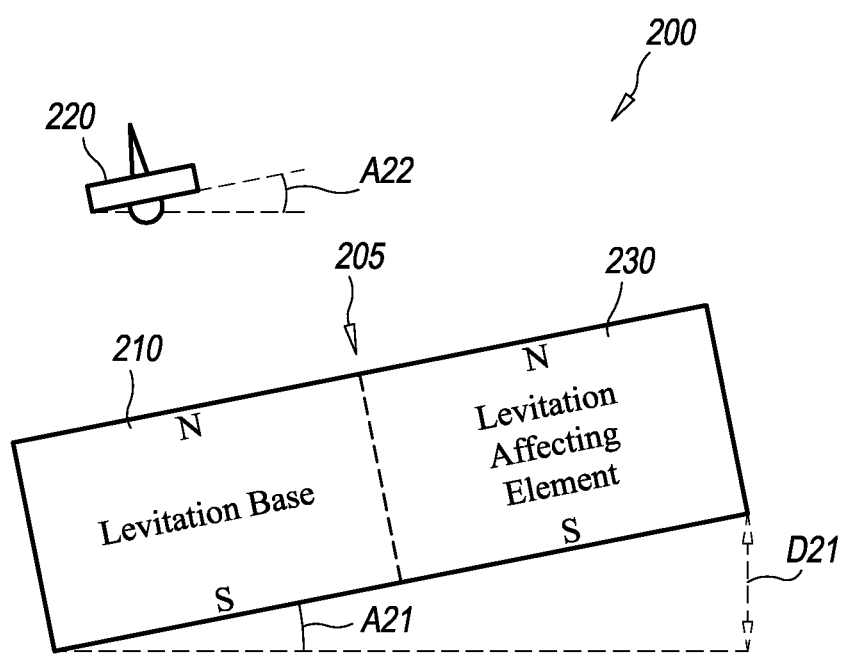
FIG. 2 is a diagram of a second exemplary embodiment of a levitation system formed in accordance with the present invention.

FIG. 2 is a diagram of a second exemplary embodiment of a levitation system 200 formed in accordance with the present invention. As shown in FIG. 2, the levitation system 200 includes a levitation and adjustment base 205 and a float element 220. The levitation and adjustment base 205 includes a levitation base 210 and a levitation affecting element 230. In one embodiment, the levitation and adjustment base 205 may comprise a single piece of magnetic material wherein the levitation base 210 and the levitation affecting element 230 comprise different magnetized regions, and the levitation base 210 region may be defined by the area over which the float element 220 is generally located during magnetic levitation.

As shown in FIG. 2, the right side of the levitation and adjustment base 205 is raised to a height D21 which causes a tilt angle A21, which causes the float element 220 to have a tilt angle A22 during magnetic levitation. As described above with respect to FIG. 1, the tilt angle A22 of the float element 220 may be different (e.g. greater) than the tilt angle A21 of the levitation and adjustment base 205. In one embodiment, the levitation base 210 may be formed such that it would be capable of supporting magnetic levitation of the float element 220 by itself if the levitation affecting element 230 were not present, with a tilt angle of A21 of approximately zero degrees and a proper mass adjustment of the float element 220.

Figure 3A:
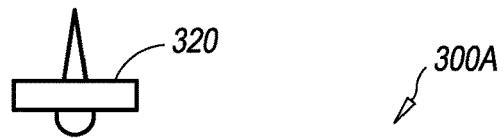
FIGS. 3A-3C are diagrams of a third exemplary embodiment of a levitation system formed in accordance with the present invention.
Figure 3A:
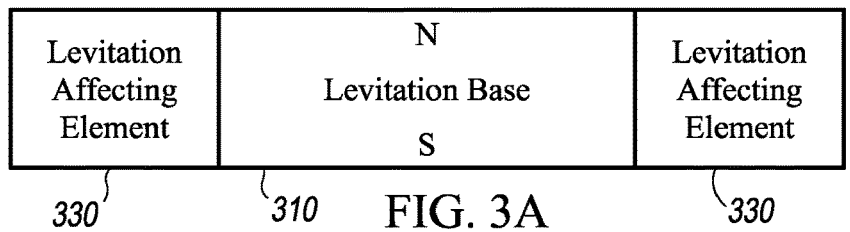

FIG. 3A is a diagram of a third exemplary embodiment of a levitation system 300A formed in accordance with the present invention. As shown in FIG. 3A, the levitation system 300A includes a levitation base 310, a float element 320 and one or more levitation affecting elements 330. In one embodiment, the levitation affecting elements 330 may be formed as part of the same magnetic material as the levitation base 310, or may be formed as separate units. The one or more levitation affecting elements 330 may be disposed on different sides of the levitation base 310, or may surround the levitation base 310 (e.g. three or more levitation affecting elements 330 surrounding the levitation base 310 in a triangular pattern, four or more in a square pattern, etc.). In the levitation system 300A, the levitation base 310 is shown to be at an approximately level position, with a tilt angle of approximately zero degrees. In this configuration of this specific example embodiment, the levitation affecting elements 330 have very small magnetic fields and are utilized primarily to adjust the required mass of the float element 320 for magnetic levitation but not the required tilt of the levitation base 310.

Figure 3B:
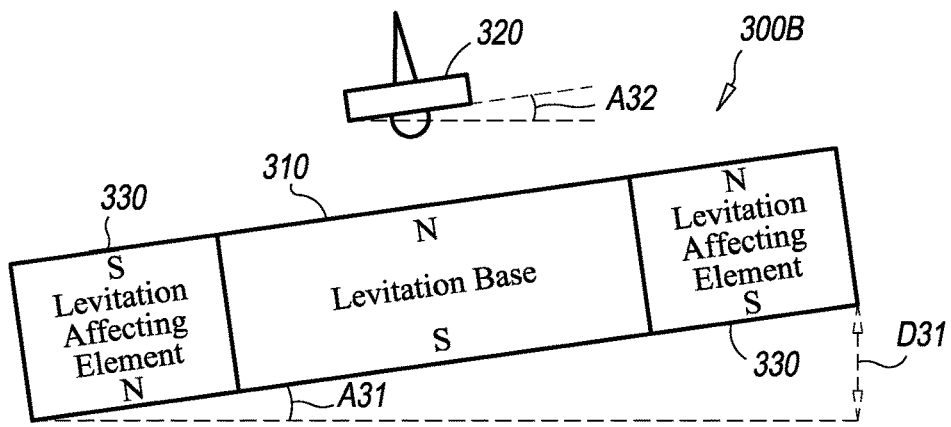
Figure 3C:
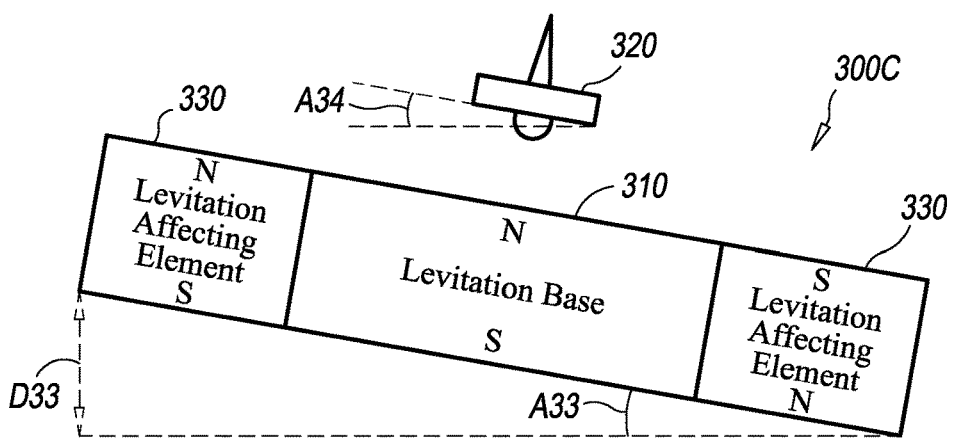

As shown in FIG. 3B, in a levitation system 300B the levitation affecting element 330 on the right has its right side raised to a height D31 such that the levitation base 310 and the levitation affecting elements 330 are tilted at an angle A31, and the levitation affecting element 330 on the left has a south-upward magnetic field direction and the levitation affecting element 330 on the right has a north-upward magnetic field direction. This configuration adjusts the required mass and produces a tilt angle A32 of the float element 320 during magnetic levitation. As shown in FIG. 3C, in a levitation system 300C the levitation affecting element 330 on the left has its left side raised to a height D33 such that the levitation base 310 and levitation affecting elements 330 are shown to be tilted in the generally opposite direction at an angle A33, and the levitation affecting element 330 on the left has a north-upward magnetic field direction and the levitation affecting element 330 on the right has a south-upward magnetic field direction. This configuration adjusts the required mass and produces a tilt angle A34 of the float element 320 during magnetic levitation.

Thus, in the levitation systems 300B and 300C, the levitation affecting elements 330 are utilized to adjust both the amount of required mass of the float element 320 that is needed for magnetic levitation, as well as the required tilt angle of the levitation base 310 that is needed for magnetic levitation. In one embodiment, the levitation affecting elements 330 may be formed from permanent magnets. In another embodiment, the levitation affecting elements 330 may be formed from electromagnets, in which case the levitation systems 300B and 300C may be switched between by reversing the direction of the currents of the electromagnets. It will be appreciated that in certain embodiments, rather than physically tilting the elements, various mechanisms (e.g. electromagnet coils in different orientations and/or positions) may also be utilized to cause a tilt in the magnetic fields to produce similar effects.

In one embodiment, the amount of the tilt angles A32 and A34 of the float element 320 in the levitation systems 300B and 300C are measured in reference to the orientation of the float element 320 in the levitation system 300A. In other words, the orientation of the float element 320 during magnetic levitation in the levitation system 300A is determined when the magnetic fields of the levitation affecting elements 330 are either very small or zero such that they do not significantly affect the required tilt of the levitation base 310 in order to achieve the magnetic levitation. This orientation of the float element 320 in the levitation system 300A is then taken as a reference against which the tilt of the float element 320 in the levitation systems 300B and 300C is measured as the tilt angles A32 and A34.

Figure 4:
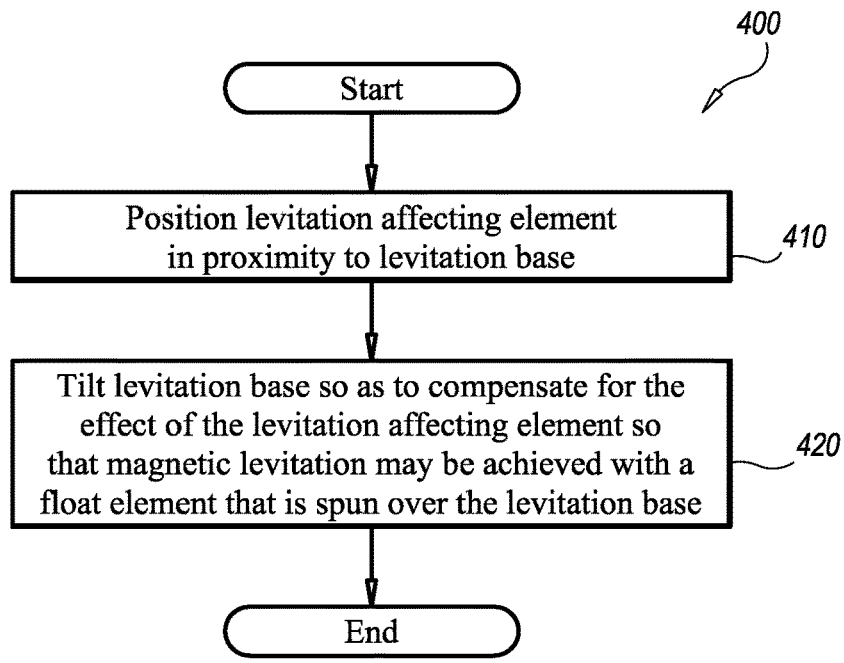
FIG. 4 is a flow diagram illustrating an exemplary embodiment of a routine for achieving magnetic levitation with a tilted orientation.

FIG. 4 is a flow diagram illustrating an exemplary embodiment of a routine 400 for achieving magnetic levitation. At a block 410, a levitation affecting element is positioned in proximity to a levitation base. At a block 420, the levitation base is tilted so as to compensate for the effect of the levitation affecting element, so that magnetic levitation may be achieved by a float element when it is spun over the levitation base. As described above, the general direction of the tilt of the levitation base required for magnetic levitation may be influenced by the north-south direction of the magnetic field of the levitation affecting element, and the amount of the tilt may be influenced by the strength and/or proximity of the magnetic field of the levitation affecting element.

Figure 5:
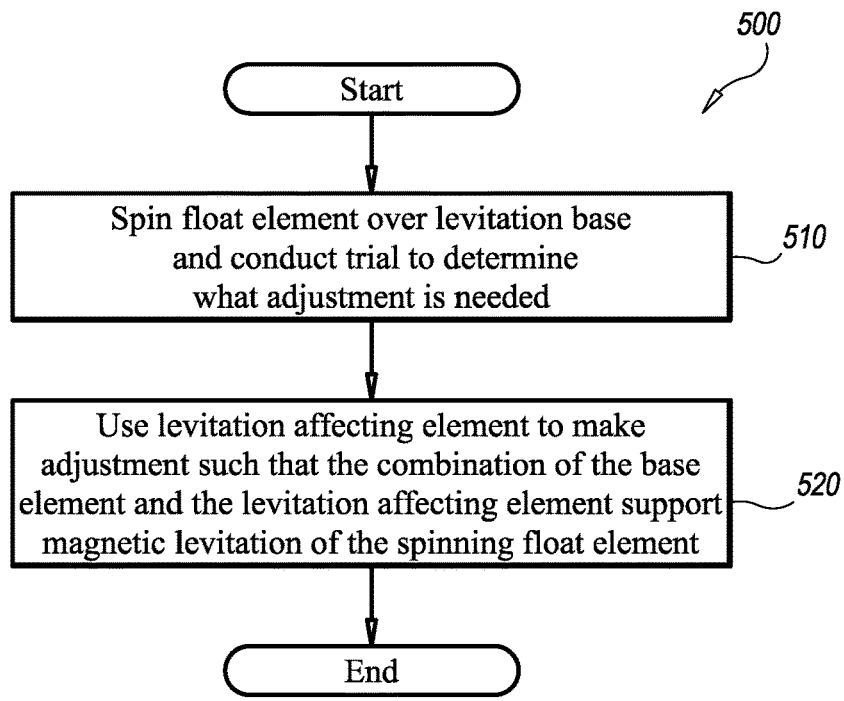
FIG. 5 is a flow diagram illustrating an exemplary embodiment of a routine for making adjustments to a levitation system.

FIG. 5 is a flow diagram illustrating an exemplary embodiment of a routine 500 for making adjustments to a levitation system. At a block 510, a float element is spun over a levitation base and a trial is conducted to determine what adjustment is needed. At a block 520, the levitation affecting element is used to make the required adjustment such that the combination of the base element and the levitation affecting element supports magnetic levitation of the spinning float element. It will be appreciated that in one embodiment, the use of the levitation affecting element to make the required adjustments may comprise moving the levitation affecting element closer to or further away from the levitation base and/or may comprise increasing or decreasing the strength of the magnetic field of the levitation affecting element (e.g. by adjusting an electromagnetic current.) The adjustment that is made may affect the required mass of the float element and/or the required tilt of the levitation base that are needed in order for magnetic levitation to be achieved.

It will be appreciated that in the prior systems, adjustments to both the tilt of the levitation base and the mass of the float element could only generally be made with manual adjustments in between each of the trial attempts. More specifically, once the float element was spun and then raised to the approximately desired height above the levitation base, if magnetic levitation was not initially achieved (i.e. if the float element fell off to one side or back to the levitation base), then adjustments to the tilt of the levitation base and the mass of the float element may again have needed to have been made (i.e. the shims or tripod adjusters may have needed to be adjusted under the base element, and the float element may have needed to be physically taken in hand and have additional washer weights manually added or removed before the next trial was begun.) In contrast, the levitation affecting element of the present invention may be utilized to make slight adjustments while a trial is occurring, and such adjustments are made off to one side of the levitation base, which in certain implementations simplifies the adjustment process and makes it less disruptive to the base system. For example, in a case where a somewhat stable levitation is achieved during a trial (the float element remains levitating but is bobbing up and down significantly) this may indicate that a slight mass and/or tilt adjustment may be needed, in which case one or more levitation affecting elements (e.g. as described above with respect to FIGS. 3A-3C) may be moved closer or further away (or in the case of electromagnets may have their strength increased or decreased) so as to further increase the stability of the levitation of the float element.

While the preferred embodiment of the invention has been illustrated and described, numerous variations in the illustrated and described arrangements of features and sequences of operations will be apparent to one skilled in the art based on this disclosure. For example, while the levitation affecting element has generally been illustrated and described in certain embodiments herein as being made of one or more magnets, it will be appreciated that in certain alternative embodiments, other materials may also be utilized (e.g. ferrous materials) which in combination with the magnetic levitation base can achieve similar affects and support magnetic levitation of the float element. Thus, it will be appreciated that various changes can be made therein without departing from the spirit and scope of the invention.

The embodiments of the invention in which an exclusive property or privilege is claimed are defined as follows:

1. A magnetic levitation system comprising:
    a base element comprising at least a base magnet portion producing at least a first magnetic field portion;
    a float element comprising at least a float magnet portion, the float element during magnetic levitation being located in an orientation proximate to the base element such that the float magnet portion and the base magnet portion are in a relation which produces sufficient magnetic force so as to counteract at least a portion of the gravitational force upon the float element such that magnetic levitation of the float element is achieved; and
    a levitation affecting element which in combination with the first magnetic field portion supports the magnetic levitation of the float magnet portion, the levitation affecting element not being centered above or below the base magnet portion or the float magnet portion during the magnetic levitation,
    wherein a magnetic field formed by the combination of the base element and the levitation affecting element is non-symmetrical about a vertical axis which runs through the average location of the center of the float element during magnetic levitation.

2. The levitation system of claim 1, wherein the levitation affecting element comprises at least a levitation affecting magnet portion.

3. The levitation system of claim 2, wherein the base magnet portion and the levitation affecting magnet portion are formed in regions of a single piece of magnetic material, the base magnet portion comprising a first magnetized region and the levitation affecting magnet portion comprising a second magnetized region in the single piece of magnetic material.

4. The levitation system of claim 2, wherein the base magnet portion, the levitation affecting magnet portion and the float magnet portion each comprise at least one of a permanent magnet or an electromagnet which are able to maintain the magnetic levitation without requiring an electronic feedback system.

5. The levitation system of claim 1, wherein the levitation affecting element is positioned to one side of the base element and further comprising means for adjusting a tilt at which the float magnet portion is oriented during magnetic levitation.

6. The levitation system of claim 1, wherein at least one of an amount or a general direction of a tilt of the float magnet portion that is achieved during the magnetic levitation or a required mass of the float element that is needed to achieve the magnetic levitation is adjusted at least in part by adjusting the levitation affecting element by altering one or more of the proximity of the levitation affecting element to the base element or the strength or north-south direction of a levitation affecting magnetic field portion produced by the levitation affecting element.

7. The levitation system of claim 1, wherein a tilt of the average orientation of the float magnet portion during magnetic levitation is in reference to an orientation of the float magnet portion as it would exist during magnetic levitation over the base magnet portion if the effect of the levitation affecting element was removed from the system and the mass of the float element and the tilt of the base magnet portion were adjusted to achieve the magnetic levitation without the effect of the levitation affecting element.

8. The levitation system of claim 1, wherein a tilt of the average orientation of the float magnet portion during magnetic levitation at least 5°.

9. The levitation system of claim 1, wherein the float magnet portion has at least an axis and a surface, the float magnet portion being magnetized normal to the surface and parallel to the axis, the float magnet portion spinning about the axis during magnetic levitation.

10. The levitation system of claim 9, wherein the base magnet portion has an axis, the axis of the float magnet portion during magnetic levitation not being substantially coaxial with the axis of the base magnet portion.

11. The levitation system of claim 10, wherein during magnetic levitation the axis of the base magnet portion is tilted with respect to a vertical reference, and a tilt of the average orientation of the float magnet portion during magnetic levitation is in relation to the base magnet portion rather than being in relation to a horizontal or vertical reference.

12. The levitation system of claim 10, wherein during magnetic levitation the axis of the base magnet portion is tilted with respect to a vertical reference and the axis of the float magnet portion during magnetic levitation is tilted at least approximately 1.5 times as much with respect to the vertical reference as the tilt of the axis of the base magnet portion.

13. A magnetic levitation system comprising:
a first magnet having a first axis and a first surface, the first magnet being magnetized normal to at least a portion of the first surface and parallel to the first axis such that the first surface has a magnetic field with a first polar orientation;
a second magnet having a second axis and a second surface, the second magnet being magnetized normal to at least a portion of the second surface and parallel to the second axis such that the second surface has a magnetic field with the same polar orientation as the magnetic field of the first surface of the first magnet, the second magnet magnetically levitating proximate to the first magnet when the second magnet is rotated about the second axis and disposed proximate to the first magnet with the first and second surfaces in confronting relation; and
a third magnet which affects the magnetic levitation, the third magnet being located proximate to the first magnet but not centered relative to the first or second magnets during magnetic levitation.

14. The magnetic levitation system of claim 13, wherein a tilted orientation of the second magnet during magnetic levitation is in relation to the orientation of the second magnet that would exist if the effect of the third magnet were removed from the system and the system was adjusted such that magnetic levitation of the second magnet was achieved without the affect of the third magnet.

15. The magnetic levitation system of claim 13, wherein an average tilted orientation of the axis of rotation of the second magnet during a period of magnetic levitation is at least 5° relative to a vertical plane.

16. The levitation system of claim 13, wherein the first magnet is made entirely of a magnetic material and its magnetic field is weakened in a region of the first surface of the first magnet, and when the second magnet is rotated about the second axis and disposed proximate to the first magnet with the first and second surfaces in confronting relation, the second magnet magnetically levitates proximate to the first magnet.

17. A method for magnetic levitation comprising:
positioning a float magnet with a float magnetic field portion proximate to a base magnet with a base magnetic field portion so that the float magnet will levitate; and
adjusting a magnetic levitation affecting element that is proximate to the base magnetic field portion so that it will affect the levitation of the float magnet, the magnetic levitation affecting element not being centered relative to the base magnetic field portion or the float magnet magnetic field portion during magnetic levitation,
wherein a tilted orientation of the float magnetic field portion during magnetic levitation is in relation to the orientation of the float magnetic field portion that would exist if the effect of the magnetic levitation affecting element were removed from the system and the system was adjusted such that magnetic levitation of the float magnet was achieved without the affect of the magnetic levitation affecting element.

18. The method of claim 17, wherein a tilt of the base magnetic field portion is at least 5°.

19. A magnetic levitation system comprising:
a base element comprising at least a base magnet portion producing at least a first magnetic field portion;
a float element comprising at least a float magnet portion, the float element during magnetic levitation being located in an orientation proximate to the base element such that the float magnet portion and the base magnet portion are in a relation which produces sufficient magnetic force so as to counteract at least a portion of the gravitational force upon the float element such that magnetic levitation of the float element is achieved; and
a levitation affecting element which in combination with the first magnetic field portion supports the magnetic levitation of the float magnet portion, the levitation affecting element not being centered above or below the base magnet portion or the float magnet portion during the magnetic levitation,
wherein a tilt of the average orientation of the float magnet portion during magnetic levitation is in reference to an orientation of the float magnet portion as it would exist during magnetic levitation over the base magnet portion if the effect of the levitation affecting element was removed from the system and the mass of the float element and the tilt of the base magnet portion were adjusted to achieve the magnetic levitation without the effect of the levitation affecting element.

20. A magnetic levitation system comprising:

a base element comprising at least a base magnet portion producing at least a first magnetic field portion;

a float element comprising at least a float magnet portion, the float element during magnetic levitation being located in an orientation proximate to the base element such that the float magnet portion and the base magnet portion are in a relation which produces sufficient magnetic force so as to counteract at least a portion of the gravitational force upon the float element such that magnetic levitation of the float element is achieved; and a levitation affecting element which in combination with the first magnetic field portion supports the magnetic levitation of the float magnet portion, the levitation affecting element not being centered above or below the base magnet portion or the float magnet portion during the magnetic levitation, wherein:

the levitation affecting element comprises at least a levitation affecting magnet portion;

the float magnet portion has at least an axis and a surface, the float magnet portion being magnetized nominally normal to the surface and parallel to the axis, the float magnet portion nominally spinning about the axis during magnetic levitation;

the base magnet portion has an axis, the axis of the float magnet portion during magnetic levitation not being substantially coaxial with the axis of the base magnet portion; and during magnetic levitation the axis of the base magnet portion is not vertical and the axis of the float magnet portion during magnetic levitation is also not vertical.

21. The magnetic levitation system of claim 20, wherein the levitation affecting magnet portion has an axis, and during magnetic levitation the axis of the levitation affecting magnet portion is also not vertical.

* * * * *